United States Patent [19]

Artman

[11] Patent Number: 5,031,588
[45] Date of Patent: Jul. 16, 1991

[54] INTERNAL COMBUSTION ENGINE UTILIZING STRATIFIED CHARGE COMBUSTION PROCESS

[76] Inventor: Noel G. Artman, 17300 N. 88th Ave., Apt. 337, Peoria, Ariz. 85382

[21] Appl. No.: 513,373

[22] Filed: Apr. 23, 1990

[51] Int. Cl.$^5$ ............................................. F02B 19/08
[52] U.S. Cl. .................................. 123/262; 123/280; 123/290
[58] Field of Search .................. 123/84, 86, 311, 253, 123/262, 263, 280, 290

[56] References Cited

U.S. PATENT DOCUMENTS

| | | | |
|---|---|---|---|
| 4,465,035 | 8/1984 | Artman | 123/263 |
| 4,784,098 | 11/1988 | Artman | 123/262 |

FOREIGN PATENT DOCUMENTS

| | | | |
|---|---|---|---|
| 87913 | 9/1936 | Sweden | 123/262 |
| 30116 | 11/1903 | Switzerland | 123/311 |
| 4776 | of 1905 | United Kingdom | 123/311 |
| 329780 | 5/1930 | United Kingdom | 123/262 |

*Primary Examiner*—Willis R. Wolfe, Jr.
*Assistant Examiner*—Thomas N. Moulis
*Attorney, Agent, or Firm*—Noel G. Artman

[57] ABSTRACT

Internal combustion stratified-charge engine having within a cylinder thereof a variable volume space wherein a piston pursuant to an air intake stroke draws a stream of intake air through an entrance end of the combustion chamber and through such chamber into said variable volume space. The inner periphery of a sidewall of such chamber having a series of grooves which may score the head of a poppet type exhaust valve in such periphery and which contribute to stratification of a leading fuel-free mass of such stream and a fuel-containing trailing mass thereof into the variable volume space. A portion of such trailing fuel-containing mass remaining in the chamber and an adjacent portion thereof in the variable volume space adjacent to said chamber, and, pursuant to the ensuing compression stroke of the piston, the masses are caused to flow into the chamber in the reverse order of their formation with the fuel-containing mass compressed adjacent the entrance end of the chamber where combustion is initiated.

6 Claims, 1 Drawing Sheet

INTERNAL COMBUSTION ENGINE UTILIZING STRATIFIED CHARGE COMBUSTION PROCESS

SUMMARY OF THE INVENTION

The combustion process herein presented provides ample time during end-to end air intake and compression phases for thorough homogeneous mixing of injected fuel in the air-fuel stratum which, with provision of rapid swirl of this highly compressed stratum, are conducive to dimishing pollutive exhaust emission, reliable ignition, fast burn and extension of the lean mixture misfire limit.

The combustion chamber is formed in the cylinder head and communicates through an opening in its lower end with the upper end of a cylinder which contains a piston reciprocal in a variable volume space existing between a top dead center position adjacent to said upper end and a bottom dead center position spaced downwardly therefrom. The combustion chamber has a sidewall of less diameter than said variable volume space and curved about an axis extending upwardly from said variable volume space to an upper end containing a poppet valve for admitting an inlet air stream into and through said chamber axially into the variable space in response to a downward air inlet stroke of the piston. An important object of this invention is the provision of grooves spaced circumferentially in said sidewall and extending helically downwardly and curved in the same direction to direct a tubular portion of said air stream into said variable volume space. A core portion of said stream is admitted to said variable volume space inside the tubular portion which imparts circular motion to the core portion in said space. A fuel-free leading portion of the air stream is followed by a trailing fuel-bearing portion which because of the circular motion of the tubular and core portions in the variable volume space are stratified therein in axial seriatim. Because of the combustion chamber being of less diameter than the variable volume space the fuel-bearing strata in the combustion chamber and in the upper portion of the variable volume space, attendant to the next compression movement of the piston, are driven and compressed by the strata of fuel-free air into the combustion chamber end adjacent to the air inlet poppet valve, where it is ignited.

Another object of this invention is the provision in the combustion chamber sidewall of an exhaust opening closed by a poppet valve. The head of such valve may contain a groove segment forming part of a groove in said sidewall. Said grooves increase the capacity of the combustion chamber while providing means for causing swirl and stratification of fuel-free air and fuel-bearing air in the variable volume space.

DESCRIPTION OF THE DRAWING FIGURES

DESCRIPTION AND EXPLANATION OF THE INVENTION

Figures 1, 2, 3, 4:
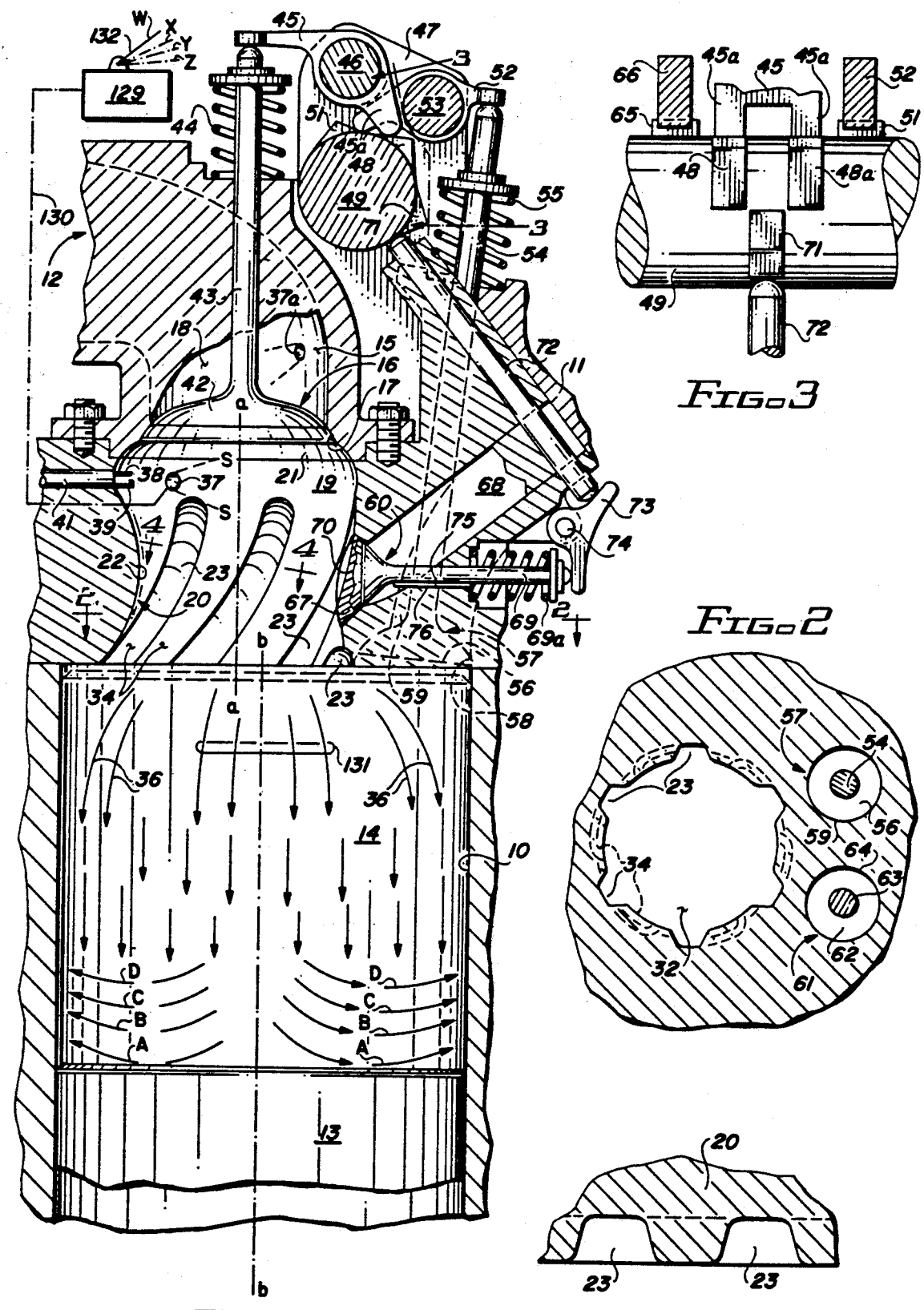
FIG. 1 is a fragmentary view taken sectionally through an engine cylinder and cylinder head containing a combustion chamber and air deflecting gooves arranged in accordance with this invention.
FIG. 2 is a fragmentary sectional view taken at the plane indicated by the line 2—2 in FIG. 1.
FIG. 3 is a fragmentary view of a valve cam arrangement for the intake and exhaust valves, taken on the line 3—3 in FIG. 1.
FIG. 4 is a fragmentary view illustrating the contour of air deflecting grooves, taken on the line 4—4 in FIG. 1.

A cylinder 10 and cylinder head 11 of a 4-stroke cycle internal combustion engine 12 embodied in a preferred form of this invention are most completely shown in FIGS. 1 and 2. A piston 13 reciprocates conventionally in the cylinder pursuant to varying the volume of an alternately expandable and contractable variable volume space 14 in the cylinder between the piston and the cylinder head. An inlet passage 15 communicating with the variable volume space contains an air inlet valve 16 of the poppet type having an annular seat 17 diposed between an upstream portion 18 of such passage and a precombustion chamber 19 which is a section of the passage. Thus this chamber is interposed serially between the variable volume space 14 and the upstream passage portion 18.

Chamber 19 has a principal axis a-a extending between opposite ends thereof and of which ends one, designated 21, is an air inlet end communicative with the upstream passage portion 18 through the valve seat 17 which surrounds the axis a—a. The other end of the chamber is an open end in juxtaposed two-way open communication with the variable volume space 14. The chamber has a curved sidewall 20 with an inwardly-facing periphery 22 surrounding the axis a—a.

Said sidewall is scored by a series of grooves 23 spaced circumferentally therein and extending from the upper portion of said sidewall to the lower end thereof where they communicate with the variable volume space 14. The gooves slant in the same direction helically about said curved sidewall to receive and impart helical motion to a tubular portion of an air stream entering the chamber through the seat 17 of inlet valve 16 when it is open, and direct such portion helically into the variable volume space 14.

A diagrammatically shown fuel injection nozzel 37 is adapted to inject fuel into the chamber 19. A typical conical spray pattern for such injected fuel is represented by the dash lines S. The fuel is mixed with air in chamber 19 to form a spark-ignitable air-fuel mixture ignited by spark occuring between electrodes 38 and 39 of spark plug 41. Alternately a fuel injector unit 37a could be located in the air intake passage above the intake valve to inject into the chamber when the valve is open.

Poppet valve 16 has a head 42 on a stem 43 which is typically unseated from the valve seat 17 by downward thrust of the stem against the force of a spring 44. This downward thrust is provided through a rocker arm 45 pivoting on a bearing 46 supported by a bracket 47 mounted on the cylinder head. The lower end of rocker arm 45, FIG. 3, has fucations 45a spaced axially of the overhead cam shaft 49. Cams 48 and 48a rotatable with the cam shaft pivots the rocker arm 45 to operate the valve 16 in timed relation with the engine crankshaft, not shown. A second cam 51 on the camshaft pivots rocker arm 52 on its bearing 53 to thrust an exhaust valve stem 54 downwardly against the force of a spring 55 to unseat the head 56 of exhaust valve 57 from its seat 58 and establish communication of variable volume space 14 with an exhaust passage 59. There are three exhaust valves 60, 57 and 61, FIGS. 1 and 2, the latter being conventionally operated similarly to valve 57 and having a head 62 on stem 63 and controlling communication of the variable volume space 14 with an exhaust passage 64. Stem 63 is operated by a cam 65, FIG. 3, and a cam-operated arm 66 corresponding to cam 51 and arm 52.

The exhaust valve 60 has a head 67 controlling entrance to an exhaust passage 68. The head is on the stem 69 surrounded by a spring 69a urging the valve closed. The valve head is passed through by a portion 70 of one of the grooves 23. A cam 71 on cam shaft 49 is of a height to pass between furcations 45a of lever 45 when the shaft is rotated. This cam 71 forces the rod 72 downwardly agaist a lever 73 to pivot the same clockwise about a bearing 74 as viewed in FIG. 1 to press the valve stem 69 to the left to open the exhaust valve 60. A rib 75 on the valve stem is slidable in a groove 76 in the bore for the valve stem 69 and prevents rotation of the valve strem and also prevents the groove portion 70 in the groove 23 becoming misaligned with the remainder of the groove.

ENGINE OPERATION

Operation of an engine incorporating the above described components is as follows: Starting with the downward air-intake stroke of piston 13 of this 4-stroke cycle engine, air is drawn inwardly through the upstream portion 18 of the air-intake passage 15 past the then open intake valve 16 and through the precombustion chamber 19 into the variable volum space 14 while the exhaust valves 57, 60 and 61 are closed. Any contaminates such as as incompletely oxidized hydrocarbons retained in the chamber during the preceeding exhaust stroke of the piston, are swept from the chamber with the intake air into the variable volume space.

That part of the intake air entering the variable volume space from chamber 19 does so in the form of a stream composed of a tubular portion 34, FIG. 2, induced by the grooves 23 to flow downwardly against the periphery 22 of the combustion chamber sidewall 20, and continuing downwardy, following the piston 13 helically along the sidewall of the cylinder 10 as indicated by the arrows 36. A core portion 32 of the stream is surrounded by the tubular portion, FIG. 2, and enters the variable volume space as indicated by the bundles of arrows 131. The helically moving tubular portion of the stream engages and imparts helical motion to the radially outer part of the stream core portion. The stream core portion because of approaching the piston crown with greater speed than the helically moving tubular portion, will be deflected by such crown first radially outwarly and then by the cylinder wall upwardly relatively to the piston and between the downwardly-flowing part of the core portion and the cylinder wall. This "upwardly deflected" air constitutes an annular reflux which if left unopposed would flow upwardly relatively to the downwardly-moving piston. But, the first of this "upwardly deflected" air of annular refux, formed adjacently to the piston crown while the piston is in the early part of its descent fron top dead center, will be forced by the downwardly-moving helical tubular portion to follow the piston downwardly. The first of such annular reflux air is represented by the arrows A in FIG. 1. Succeeting parts of this reflux air, respectively represented by arrows B, C and D, are also forced downwardly by the helical tubular air portion represented by arrows 36. The result of the motions of these two air stream portions is that the air entering the variable volume space laminates or stratifies with the stratum disposed in seriatim axially of the cylinder.

The grooves 23 are conducive to the formation and flow of the tubular portion of the air stream by expansion thereof instead of offering resistance as in the case of vanes which partially block the flow. The grooves promote a faster flow of this portion of the stream. Also the grooves have no projections which can be the source of hot spots causing preignition.

Pursuant to the ensuing compression stroke of the pistion, when the intake and exhaust valves are all closed and because the combustion chamber 19 is smaller in diameter than the variable volume space 14, the air in such chamber will be compressed against the upper closed end thereof, and the stratified air forced from the contracting variable volume space into the chamber in the reverse order in which the strata were forced into said space. The stratification process will result in a fuel-containing mass of air being compressed into the upper end of chamber 19 and a segregated mass of fuel-free air compressed in the lower part of the chamber. The compressed fuel-containing mass is ignited to drive the piston downwardly in a power stroke.

Segregation of the fuel-containing mass in a small chamber in the cylinder head from a fuel-free mass causes a diminution of emissions because the flame of combustion does not pervade the fuel-free mass. Also, the smaller volume of the space occupied by the fuel-containing mass involves less distance for the flame to travel requiring less time, creating a fast burn condition. When the smaller fuel-containing mass contains all of the fuel, the HC molecules thereof can be compressed closer together pursuant to the compression stroke of the piston than they would be if they were spread throughout the charge in a homogenous mixture. This increased density makes it possible to lower the misfire limit with less fuel.

Fuel is supplied to the injector 37 by a schematically illustrated fuel supply system 129 through a conduit 130. One form of fuel supply system operable in the sequence described below is explained in detail in my U.S. Pat. No. 4,784,098. A first mode of operation is caused to function during advancement of a control lever 132 for the control system from position W to position X. The first mode, if the equipment is is installed in an automibile, is one that conserves fuel and dimishes harmful exhaust emissions. This is accomplished by initiating a lean volume fuel delivery, and such delivery rate is increased according to the rate of deliverd air increase so the mixture of air to fuel remains substantially constant. This condition prevails until the lever reaches position X when it is desired to change to a different mode to get more power. The first mode provides enough power for idle operation and slow speed with its saving on fuel and exhaust emissions.

The second mode endures during movement of the control lever from position X to position Y. During this mode there is a further increase in the fuel injection rate for the same length of injection period. As a consequence more power is available for crusing speed.

The third operational mode is commenced during movement of the control lever from position Y to position Z. This causes both the combustion chamber and the variable volume space to be filled with fuel-laden air which is increased in density as position Z is approached. All of the air is then used for combustion to obtain maximum power.

I claim:

1. In an internal combustion engine in which a piston is reciprocal alternatly toward and from the upper end of a cylinder within a variable volume space adjacent to such end, a cylinder head having a face in closing relation with such clinder end and containing a precombustion chamber with a sidewall having an inner periphery constructed about an axis extending upwardly from the cylinder and the perihery having an open lower end in two-way communication through said face with said variable volume space, said lower open end being smaller in diameter than the diameter of said cylinder, the upper end of said chamber having an air inlet passage closable by a valve, the chamber being operable when said valve is open and attendant to movement of the piston downwardly from said upper cylinder end to receive from said inlet passage a main inlet air stream and conduct the same downwardly therein and discharge the same through said open end downwardy therein and discharge the same through said open end downwardy into said variable volume space, and said inner periphery of the precombustion chamber containing groove means consisting of a series of grooves spaced apart circumferentially therein and extending spirally downwardly in the same direction without increasing their pitch as they progress downwardly to discharge a peripheral portion of the air stream received thereby helically into the variable space.

2. The combination set forth in claim 1, wherein sidewall has an exhaust opening closable by a poppet valve head which opens inwardly of said wall and which when in closed relation with said opening its inner surface forms part of said periphery, and said head being traversed by a part of said groove means.

3. The combination set forth in claim 1, wherein saidwall has an exhaust opening closable by a poppet valve head which opens opens inwardly of said sidewall and which when in closed relation with said opening part of its inner surface forms part of said periphery.

4. The combination set forth in claim 1, wherein the lower end portion of the periphery comtaining the grooves is flared radially outwardly.

5. An internal combustion engine in which a piston is reciprocal alternately toward and from the upper end of a cylinder within a variable volume space adjacent to such end, a cylinder head having a face in closing relation with said cylinder end and containing a precombustion chamber with a sidewall having an inner periphery formed about an axis extending upwardly from said cylinder, the periphery having an open lower end in two-way communication through such face with said variable volume space, the open end of the periphery being smaller across than the diameter of said cylinder, the upper end of said chamber having an air inlet opening closable by a valve, the chamber being operable attendant to movement of the piston from said cylinder upper end to receive through said inlet opening a main inlet air stream and conduct a leading portion thereof axially downwardly through said chamber and discharge the same through said open end downwardly into into said variable volume space and impregnating a trailing portion of said stream with fuel while conducting such portion to form a fuel-bearing mass occupying space within the upper part of the variable volume space and in said chamber, and the inner periphery of the chamber containing groove means consisting of a series of grooves spaced apart circumferentially therein and extending spirally in the same direction and decreasing their pitch throughout their length as they progress downwardly, and said piston being operable after the closing of said valve and pursuant to movement thereof toward said cylinder upper end to reverse the flow of said air stream to compress the fuel-bearing mass in said chamber and in the upper part of the variable volume space into the upper end of said chamber and to force air from said variable volume space into said chamber in axial seriatim with respect to the fuel-bearing mass attendant to discharging portions of said air stream received by said grooves helically into said chamber.

6. In a 4-cycle internal combustion engine in which a piston is reciprocal alternately toward and from the upper end of a cylinder within a variable volume space adjacent to such end, a cylinder head having a face in closing relation with such cylinder end and containing a precombustion chamber with a sidewall having an inner periphery extending upwardly from the cylinder and the periphery surrounding an open lower end and which is in two-way commmunication through such face with said variable volume space, the transverse area of the combustion chamber at each horizontal position throughout its length being exceeded by the diameter of said cylinder, the upper end of said chamber having an air inlet passage closable by a valve, the chamber being operable when said valve is open and attentent to movement of the piston downwardly from said upper per cylinder end to receive a main inlet air stream through said inlet passage and conduct the same downwardly therein and discharge the same through said open end downwardy into said variable volume space, and wherein said sidewall has an exhaust opening closable by a poppet valve head which is moved inwardly from the sidewall and from such opening to open the same and moved outwardly toward said sidewall an opening to close the same, and wherein said periphery of the precombustion chamber contains groove means consisting of a series of grooves spaced apart transversely therein and extending spirally in the same direction downwardly toward said variable volume space to discharge a peripheral portion of said stream received thereby helically into said variable volume space, and said exhaust valve head contains a portion of sais groove means which when said valve head is closed forms part said groove means receiving a circumferental part of the peripheral portion of the air stream.

* * * * *